(12) United States Patent
Zhang et al.

(10) Patent No.: US 10,201,828 B2
(45) Date of Patent: Feb. 12, 2019

(54) COATING SYSTEM AND COATING METHOD

(71) Applicants: BOE Technology Group Co., Ltd., Beijing (CN); HEFEI BOE Optoelectronics Technology Co., Ltd., Hefei (CN)

(72) Inventors: Xiaomei Zhang, Beijing (CN); Zhiqiang Wang, Beijing (CN)

(73) Assignees: BOE Technology Group Co., Ltd., Beijing (CN); Hefei BOE Optoelectronics Technology Co., Ltd., Hefei (CN)

(*) Notice: Subject to any disclaimer, the term of this patent is extended or adjusted under 35 U.S.C. 154(b) by 169 days.

(21) Appl. No.: 15/127,692

(22) PCT Filed: Oct. 29, 2015

(86) PCT No.: PCT/CN2015/093226
§ 371 (c)(1),
(2) Date: Sep. 20, 2016

(87) PCT Pub. No.: WO2016/192290
PCT Pub. Date: Dec. 8, 2016

(65) Prior Publication Data
US 2018/0178242 A1 Jun. 28, 2018

(30) Foreign Application Priority Data
Jun. 1, 2015 (CN) .......................... 2015 1 0297672

(51) Int. Cl.
*B05C 11/02* (2006.01)
*B05C 5/02* (2006.01)
(Continued)

(52) U.S. Cl.
CPC ................ *B05C 11/02* (2013.01); *B05C 5/02* (2013.01); *B05C 9/00* (2013.01); *B05C 21/00* (2013.01)

(58) Field of Classification Search
None
See application file for complete search history.

(56) References Cited

U.S. PATENT DOCUMENTS 4,702,931 A   10/1987  Falcoff

FOREIGN PATENT DOCUMENTS

| CN | 1846875   | * | 10/2006 |
| CN | 1846875 A |   | 10/2006 |

(Continued)

OTHER PUBLICATIONS

Sep. 29, 2017—(CN) Third Office Action Appn 201510297672.8 with English Tran.

(Continued)

*Primary Examiner* — Nathan T Leong
(74) *Attorney, Agent, or Firm* — Banner & Witcoff, Ltd.

(57) ABSTRACT

A coating system and a coating method are provided. The coating system includes: a coating device, a detecting device, and an adjusting device, wherein, the coating device is configured for applying a coating material on a substrate; the detecting device is configured for detecting a film thickness of the coating material at a measuring point when the coating device is applying the coating material and sending the detected film thickness to the adjusting device; the adjusting device is configured for selectively generating a preset feeding speed according to the film thickness and sends the preset feeding speed to the coating device. The coating system and the coating method are capable of adjusting film thickness in real time.

15 Claims, 2 Drawing Sheets

(51) Int. Cl.
    *B05C 9/00*           (2006.01)
    *B05C 21/00*         (2006.01)

(56)               References Cited

FOREIGN PATENT DOCUMENTS

| | | |
|---|---|---|
| CN | 1924517 A | 3/2007 |
| CN | 101448643 A | 6/2009 |
| CN | 102359768 A | 2/2012 |
| CN | 102387868 A | 3/2012 |
| CN | 202447257 U | 9/2012 |
| CN | 103983200 A | 8/2014 |
| CN | 104858106 A | 8/2015 |
| JP | 689855 A | 3/1994 |
| JP | 3676263 B2 | 7/2005 |
| JP | 2005-238188 A | 9/2005 |
| JP | 2009034568 A | 2/2009 |

OTHER PUBLICATIONS

Mar. 4, 2016—(WO)—International Search Report and Written Opinion Appn PCT/CN2015/093226 with English Tran.
Oct. 17, 2016—(CN) First Office Action Appn 201510297672.8 with English Tran.
Apr. 17, 2017—(CN) Second Office Action Appn 201510297672.8 with English Tran.

\* cited by examiner

COATING SYSTEM AND COATING METHOD

The application is a U.S. National Phase Entry of International Application No. PCT/CN2015/093226 filed on Oct. 29, 2015, designating the United States of America and claiming priority to Chinese Patent Application No. 201510297672.8 filed on Jun. 1, 2015. The present application claims priority to and the benefit of the above-identified applications and the above-identified applications are incorporated by reference herein in their entirety.

TECHNICAL FIELD

Embodiments of the present disclosure relate to a coating system and a coating method.

BACKGROUND

Currently, in a manufacturing process of a display apparatus (such as, TFT-LCD and AMOLED), especially in a manufacturing process of a color filter substrate, coating process is an important manufacturing process. The coating process serves a function of applying a coating material on a surface of a substrate uniformly so as to form a thin film on the surface of the substrate. Since a film thickness of the thin film will affect product quality, the manufacturing process of the display apparatus has high requirements on the film thickness of the thin film. In the coating process, uniformity of coating decides whether the coating process is good or not, and also affects the film thickness of the film.

SUMMARY

An embodiments of the present disclosure provides a coating system, comprising: a coating device, a detecting device, and an adjusting device; wherein, the coating device is configured for applying a coating material on a substrate; the detecting device is configured for detecting a film thickness of the coating material at a measuring point when the coating device is applying the coating material and sending the detected film thickness to the adjusting device; the adjusting device is configured for selectively generating a preset feeding speed according to the film thickness and sends the preset feeding speed to the coating device in a case that the preset feeding speed is generated.

Another embodiments of the present disclosure provides a coating method, including: by a detecting device, detecting a film thickness of the coating material at a measuring point and sending the detected film thickness to an adjusting device, when a coating device is applying a coating material on a substrate; by the adjusting device, selectively generating a preset feeding speed according to the film thickness and sending the preset feeding speed to the coating device in a case that the preset feeding speed is generated, so that the coating device applies the coating material on the substrate at the preset feeding speed.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not imitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

There are multiple methods to control the film thickness in the prior art. However, the inventors find that no solutions can adjust the film thickness in real time in the related art.

An embodiment of the present disclosure provides a coating system and a coating method, capable of adjusting the film thickness of the coating material in real time.

Figure 1:
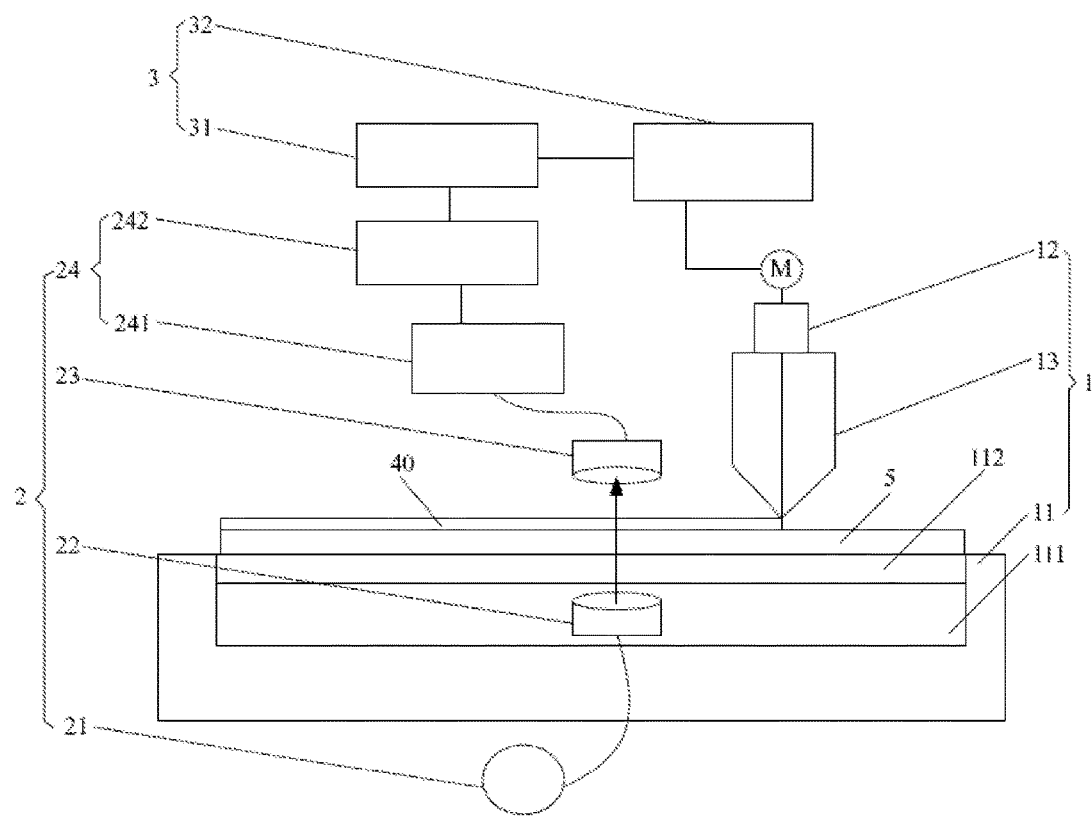
FIG. 1 is a structural schematic diagram of a coating system provided by Embodiment 1 of the present disclosure.
Figure 2:
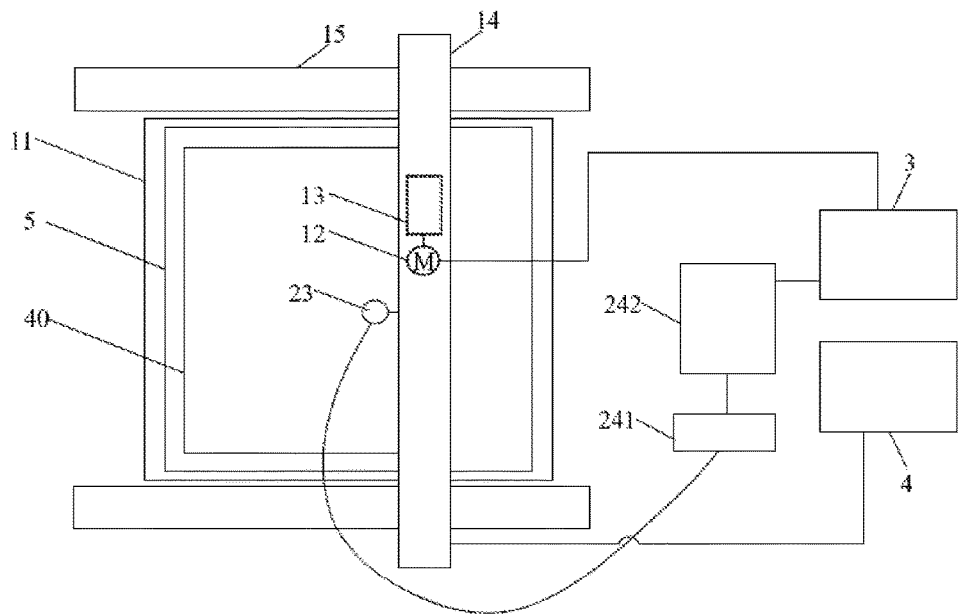
FIG. 2 is a plan schematic diagram of the coating system in FIG. 1.

FIG. 1 is a structural schematic diagram of a coating system provided by Embodiment 1 of the present disclosure; and FIG. 2 is a plan schematic diagram of the coating system in FIG. 1. As shown in FIG. 1 and FIG. 2, the coating system includes: a coating device 1, a detecting device 2, and an adjusting device 3. The coating device 1 is configured for applying a coating material 40 on a substrate 5; the detecting device 2 is configured for detecting a film thickness of the coating material 40 at a measuring point when the coating device 1 is applying the coating material 40 and sending the detected film thickness to the adjusting device 3; the adjusting device 3 is configured for selectively generating a preset feeding speed according to the film thickness and sends the preset feeding speed to the coating device 1 in a case that the preset feeding speed is generated.

The detecting device 2 detects a film thickness of the coating material at the measuring point during the coating process, wherein a position of the measuring point can be preset. The adjusting device 3 can compute the preset feeding speed according to the detected film thickness of the coating material at the measuring point and sends the preset feeding speed to the coating device 1, so that the coating device 1 can perform the coating process according to the preset feeding speed and further control the film thickness of the subsequent coating material. Furthermore, the detecting device 2 can continue to detect the film thickness at a next measuring point so as to continuously adjust the film thickness of a coating process in real time. The distance between measuring points can be set according to production needs.

The detecting device 2 includes a light source 21, a transmitting terminal 22, a receiving terminal 23, and a signal processing module 24; the transmitting terminal 22 and the receiving terminal 23 are located on two sides of the substrate and arranged opposite to each other. The light source 21 is configured for providing irradiation light for the transmitting terminal 22; the transmitting terminal 22 is configured for transmitting the irradiation light to the substrate 5 so that the irradiation light passes through the substrate 5 and the coating material 40; the receiving terminal 23 is configured for receiving the irradiation light after passing through the substrate 5 and the coating material 40 and sending the received irradiation light to the signal processing module 24; the signal processing module 24 is configured for generating the film thickness according to the received irradiation light, wherein the light source 21 can be connected with the transmitting terminal 22 through an optical fiber.

For example, the signal processing module 24 includes a spectrograph 241 and a first computing module 242. The spectrograph 241 is configured for converting the received irradiation light into a spectral line; the first computing module 242 is configured for generating the film thickness by carrying out a computing process on the spectral line. For example, the film thickness can be computed by adopting a computing method in a related art, which is not described in detail herein. Wherein, the spectrograph 241 can be connected with the receiving terminal 23 through the optical fiber.

For example, the coating device 1 includes a platform 11, a pump 12, and a nozzle 13. The nozzle 13, for example, is configured to spray the coating material 40 toward the platform. For example, the nozzle 13 is located above the substrate 5, a hollow structure 111 is arranged in the platform 11, and the hollow structure 111 is hollow. The transmitting terminal 22 is located in the hollow structure 111. The platform 11 is configured for carrying the substrate 5; the pump 12 is configured for driving the nozzle 13 to spray the coating material 40 on the substrate; and the nozzle 13 is configured for applying the coating material on the substrate 5. The transmitting terminal 22 is located in the hollow structure 111, which can save space effectively. For example, the hollow structure 111 is provided with guide rails and the transmitting terminal 22 is set on the guide rails and can slide along the guide rails. The guide rails are not specifically shown in the drawing.

For example, a material of a portion 112 of the platform 11, located between the transmitting terminal 22 and the substrate 5, is a transparent material. Here, the transparent material is the material that the irradiation light from the transmitting terminal 22 can pass through. The transparent material is adopted, which can effectively guarantee that the irradiation light emitted from the transmitting terminal 22 passes through. For example, the transparent material with high transmittance can be selected by several trials and commissioning, so as to improve the transmittance of the irradiation light.

Further, the coating device 1 can further include a mobile device 14 disposed above the substrate 5, the receiving terminal 23 and the nozzle 13 being located on the mobile device 14. For example, the receiving terminal 23 and the nozzle 13 are fixedly connected to the mobile device 14. The mobile device 14 moves above the substrate 5, for example, at a constant speed in a direction parallel to the surface of the substrate 5 so as to drive the receiving terminal 23 and the nozzle 13 to move synchronously along the direction of movement. The transmitting terminal 22 is located under the substrate 5 and is configured to move at the same speed with the receiving terminal 23 so that the transmitting terminal 22 and the receiving terminal 23 can move synchronously with the nozzle 13. The transmitting terminal 22 and the receiving terminal 23 are located behind the nozzle 13 in the moving direction. For example, the mobile device 14 can be configured to have a gantry structure. For example, as shown in FIG. 2, the coating system can include a control device 4 which is connected with the transmitting terminal 22, the mobile device 14, and the nozzle 13 respectively and configured for controlling movements of the transmitting terminal 22, the mobile device 14, and the nozzle 13, wherein, the control device 4 can be connected with the transmitting terminal 22, the mobile device 14, and the nozzle 13 through cables.

Further, the coating device further includes guide rails 15 located on two sides of the platform 11, the mobile device 14 being located on the guide rails 15. The mobile device 14 is connected with the control device 4 and can be configured for controlling the mobile device 14 to move along the guide rails. For example, because the transmitting terminal 22 and the receiving terminal 23 need to move synchronously with the nozzle 13, the control device 4 can control the transmitting terminal 22 and the receiving terminal 23 to move at the same speed with the nozzle 13, wherein, the control device 4, the mobile device 14, and the guide rail 15 are not shown in FIG. 1.

For example, the adjusting device 3 includes a judging module 31 and a second computing module 32.

The judging module 31 is configured for judging whether $|(T1-T2)/T1|$ is less than or equal to a preset difference value; if the judging module 31 judges that $|(T1-T2)/T1|$ is greater than the preset difference value, indicating that the detected film thickness does not comply with a standard film thickness, the second computing module 32 computes the preset feeding speed according to a formula $[1+(T1-T2)/T1]V$ and sends the preset feeding speed to the pump 12 in the coating device 1. Then, the pump 12 in the coating device 1 drives the nozzle 13 to perform the coating process according to the preset feeding speed thus obtained, so as to adjust film thickness in real time. Herein, T1 is a standard film thickness, T2 is a detected film thickness, and V is an original feeding speed of the coating device 1 when detecting the film thickness at the measuring point (for example, the original feeding speed of the nozzle 13). If the judging module 31 judges that $|(T1-T2)/T1|$ is less than or equal to the preset difference value, indicating that the detected film thickness complies with the standard film thickness, the second computing module 32 neither computes the preset feeding speed nor sends the preset feeding speed to the coating device 1. In this case, the coating device 1 performs the coating process at the original feeding speed. Because the predetermined film thickness that the production needs is T1±1‰ nm, the preset difference value is 1‰ nm. During the coating process, the above procedures can be repeated to detect the film thicknesses at multiple measuring points, so as to adjust the film thickness in real time in the whole coating process.

In the coating system provided by the embodiment, the detecting device detects the film thickness of the coating material at a measuring point when the coating device performs coating; the adjusting device selectively generates the feeding speed according to the film thickness; the coating device applies the coating material on the substrate according to the preset feeding speed, so as to implement adjusting the film thickness in real time. The embodiment can measure and adjust the film thickness in real time, which facilitates process control and improves the uniformity of the film thickness. Highly intelligent automation can effectively save labor cost and avoid human error, the control is precise, and the cost of raw materials is saved. The pump drives the nozzle at the recomputed preset feeding speed to change the feeding speed, so as to implement adjusting the film thickness, and the adjusting method is simple and easy to implement.

Figure 3:
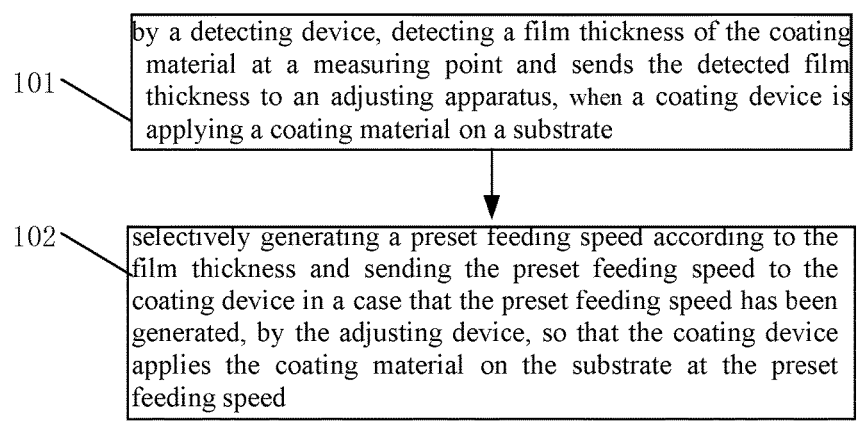
FIG. 3 is a flow diagram of a coating method provided by Embodiment 2 of the present disclosure.

FIG. 3 is a flow diagram of a coating method provided by Embodiment 2 of the present disclosure. As shown in FIG. 3, the method includes:

Step 101: by a detecting device, detecting a film thickness of the coating material at a measuring point and sends the detected film thickness to an adjusting device, when a coating device is applying a coating material on a substrate.

For example, the detecting device includes a light source, a transmitting terminal, a receiving terminal, and a signal processing module, the transmitting terminal and the receiving terminal being located on two sides of the substrate and arranged opposite to each other. For example, step 101 may include:

Step 1011: by the light source, providing irradiation light for the transmitting terminal.

Step 1012: by the transmitting terminal, transmitting the irradiation light to the substrate so that the irradiation light passes through the substrate and the coating material.

Step 1013: by the receiving terminal, receiving the irradiation light after passing through the substrate and the coating material, and sending the received irradiation light to the signal processing module.

Step 1014: by the signal processing module, generating the film thickness according the received irradiation light.

Step 102: by the adjusting device, selectively generating a preset feeding speed according to the film thickness and sending the preset feeding speed to the coating device in a case that the preset feeding speed is generated, so that the coating device applies the coating material on the substrate at the preset feeding speed.

For example, the adjusting device includes: a judging module and a second computing module. For example, the step 102 includes:

Step 1021: by the judging module, judging whether $|(T1-T2)/T1|$ is less than or equal to a preset difference value. If no, step 1022 is performed; if yes, the procedure is complete.

Step 1022: by the second computing module, computing the preset feeding speed according to a formula $[1+(T1-T2)/T1]V$ and sending the preset feeding speed to the coating device, wherein, T1 is a standard film thickness, T2 is the detected film thickness, and V is an original feeding speed of the coating device 1 when the detecting device is detecting the film thickness at a measuring point (for example, the original feeding speed of the nozzle 13).

The coating method provided by the embodiment can be implemented by adopting the coating system provided by Embodiment 1. Refer to Embodiment 1 for the description of the coating system, which is not repeated here.

In the coating method provided by the embodiment of the present disclosure, the detecting device detects the film thickness of the coating material at a measuring point when the coating device performs coating; the adjusting device generates a preset feeding speed according to the film thickness; the coating device applies the coating material on the substrate according to the preset feeding speed, so as to implement adjusting the film thickness in real time. In the embodiments, the film thickness can be measured and adjusted in real time, thus facilitating process control and improves the uniformity of the film thickness. Highly intelligent automation can effectively save labor cost and avoid human error, the control is precise, and the cost of raw materials is saved. The pump drives the nozzle at the recomputed preset feeding speed to change the feeding speed of the nozzle 13, so as to implement adjusting the film thickness. The adjusting method is simple and easy to implement.

Although the embodiment of the disclosure has been described above in great detail with general descriptions and specific embodiments, on the basis of the embodiment of the present disclosure, various changes and improvements may be made, which is apparent to those skilled in the art. Therefore, all such changes and improvements without departing from the spirit of the disclosure are within the scope of the claims of the present disclosure.

The present application claims priority of Chinese Patent Application No. 201510297672.8 filed on Jun. 1, 2015, the disclosure of which is incorporated herein by reference in its entirety as part of the present application.

The invention claimed is:

1. A coating system, comprising: a coating device, a detecting device, and an adjusting device, wherein the coating device is configured for applying a coating material on a substrate; the detecting device is configured for detecting a film thickness of the coating material at a measuring point when the coating device is applying the coating material and sending the detected film thickness to the adjusting device; and the adjusting device is configured for selectively generating a preset feeding speed according to the film thickness and sends the preset feeding speed to the coating device in a case that the preset feeding speed is generated, wherein the detecting device includes a light source, a transmitting terminal, a receiving terminal, and a signal processing module; the transmitting terminal and the receiving terminal being located on two sides of the substrate and arranged opposite to each other;

the light source is configured for providing irradiation light for the transmitting terminal, the transmitting terminal is configured for transmitting an irradiation beam to the substrate so that the irradiation beam passes through the substrate and the coating material, the receiving terminal is configured for receiving the irradiation light after passing through the substrate and the coating material, and sending the received irradiation light to the signal processing module; and the signal processing module is configured for generating the film thickness according to the received irradiation light.

2. The coating system according to claim 1, wherein: the signal processing module includes a spectrograph and a first computing module;

the spectrograph is configured for converting the received irradiation light into a spectral line; and the first computing module is configured for generating the film thickness by carrying out a computing process on the spectral line.

3. The coating system according to claim 2, wherein: the coating device includes a platform, a pump, and a nozzle; the nozzle being located above the substrate, a hollow structure being arranged in the platform, and the transmitting terminal being located in the hollow structure;

the platform is configured for carrying the substrate;

the pump is configured for driving the nozzle to spray the coating material;

the nozzle is configured for applying the coating material on the substrate.

4. The coating system according to claim 3, wherein a material of a portion of the platform, located between the transmitting terminal and the substrate, is a transparent material.

5. The coating system according to claim 2, wherein: the adjusting device includes: a judging module and a second computing module;

the judging module is configured for judging whether $|(T1-T2)/T1|$ is less than or equal to a preset difference value;

the second computing module is configured for computing the preset feeding speed according to a formula $[1+(T1-T2)/T1]V$ in a case that the judging module judges that $|(T1-T2)/T1|$ is greater than the preset difference value, and sending the preset feeding speed to the coating device so that the coating device drives a nozzle to spray the coating material at the preset feeding speed; and where T1 is a standard film thickness, T2 is the detected film thickness, and V is an original feeding speed of the coating device when the detecting device is detecting the film thickness of the coating material at the measuring point.

6. The coating system according to claim 1, wherein:

the coating device includes a platform, a pump, and a nozzle, the nozzle being located above the substrate, a hollow structure being arranged in the platform, and the transmitting terminal being located in the hollow structure;

the platform is configured for carrying the substrate;

the pump is configured for driving the nozzle to spray the coating material; and the nozzle is configured for applying the coating material on the substrate.

7. The coating system according to claim 6, wherein, a material of a portion of the platform, located between the transmitting terminal and the substrate, is a transparent material.

8. The coating system according to claim 7, wherein:

the coating device further includes: a mobile device disposed above the substrate, the receiving terminal and the nozzle being located on the mobile device, and the transmitting terminal and the receiving terminal being located behind the nozzle;

the mobile device is movable above the substrate so that the receiving terminal and the nozzle move synchronously; and the transmitting terminal is located under the substrate and configured to move synchronously with the receiving terminal and the nozzle.

9. The coating system according to claim 7, wherein:

the adjusting device includes: a judging module and a second computing module;

the judging module is configured for judging whether $|(T1-T2)/T1|$ is less than or equal to a preset difference value;

the second computing module is configured for computing the preset feeding speed according to a formula $[1+(T1-T2)/T1]V$ in a case that the judging module judges that $|(T1-T2)/T1|$ is greater than the preset difference value, and sending the preset feeding speed to the coating device so that the coating device drives the nozzle to spray the coating material at the preset feeding speed; and where T1 is a standard film thickness, T2 is the detected film thickness, and V is an original feeding speed of the coating device when the detecting device is detecting the film thickness of the coating material at the measuring point.

10. The coating system according to claim 6, wherein:

the coating device further includes a mobile device disposed above the substrate, the receiving terminal and the nozzle being located on the mobile device, and the transmitting terminal and the receiving terminal being located behind the nozzle;

the mobile device is movable above the substrate so that the receiving terminal and the nozzle move synchronously; and the transmitting terminal is located under the substrate and configured to move synchronously with the receiving terminal and the nozzle.

11. The coating system according to claim 10, wherein:

the adjusting device includes: a judging module and a second computing module;

the judging module is configured for judging whether $|(T1-T2)/T1|$ is less than or equal to a preset difference value;

the second computing module is configured for computing the preset feeding speed according to a formula $[1+(T1-T2)/T1]V$ in a case that the judging module judges that $|(T1-T2)/T1|$ is greater than the preset difference value, and sending the preset feeding speed to the coating device so that the coating device drives the nozzle to spray the coating material at the preset feeding speed; and where T1 is a standard film thickness, T2 is the detected film thickness, and V is an original feeding speed of the coating device when the detecting device is detecting the film thickness of the coating material at the measuring point.

12. The coating system according to claim 1, wherein:

the adjusting device includes a judging module and a second computing module;

the judging module is configured for judging whether $|(T1-T2)/T1|$ is less than or equal to a preset difference value;

the second computing module is configured for computing the preset feeding speed according to a formula $[1+(T1-T2)/T1]V$ in a case that the judging module judges that $|(T1-T2)/T1|$ is greater than the preset difference value, and sending the preset feeding speed to the coating device so that the coating device drives a nozzle to spray the coating material at the preset feeding speed; and where T1 is a standard film thickness, T2 is the detected film thickness, and V is an original feeding speed of the coating device when the detecting device is detecting the film thickness of the coating material at the measuring point.

13. The coating system according to claim 6, wherein:

the adjusting device includes: a judging module and a second computing module;

the judging module is configured for judging whether $|(T1-T2)/T1|$ is less than or equal to a preset difference value;

the second computing module is configured for computing the preset feeding speed according to a formula $[1+(T1-T2)/T1]V$ in a case that the judging module judges that $|(T1-T2)/T1|$ is greater than the preset difference value, and sending the preset feeding speed to the coating device so that the coating device drives the nozzle to spray the coating material at the preset feeding speed; and where T1 is a standard film thickness, T2 is the detected film thickness, and V is an original feeding speed of the coating device when the detecting device is detecting the film thickness of the coating material at the measuring point.

14. A coating method, comprising:
by a detecting device, detecting a film thickness of a coating material at a measuring point and sending the detected film thickness to an adjusting device, when a coating device is applying a coating material on a substrate;
by the adjusting device, selectively generating a preset feeding speed according to the film thickness and sending the preset feeding speed to the coating device in a case that the preset feeding speed is generated, so that the coating device applies the coating material on the substrate at the preset feeding speed,
wherein the detecting device includes a light source, a transmitting terminal, a receiving terminal, and a signal processing module; the transmitting terminal and the receiving terminal being located on two sides of the substrate and arranged opposite to each other,
wherein the coating method further comprises:
by the light source, providing irradiation light for the transmitting terminal;
by the transmitting terminal, transmitting the irradiation light to the substrate so that the irradiation light passes through the substrate and the coating material;
by the receiving terminal, receiving the irradiation light after passing through the substrate and the coating material, and sending the received irradiation light to the signal processing module; and
by the signal processing module, generating the film thickness according to the received irradiation light.

15. The coating method according to claim 14, wherein the adjusting device includes: a judging module and a second computing module, the method further comprising:
by the judging module, judging whether $|(T1-T2)/T1|$ is less than or equal to a preset difference value; and
by the second computing module, computing the preset feeding speed according to a formula $[1+(T1-T2)/T1]V$ in a case that the judging module judges that $(T1-T2)/T1$ is greater than the preset difference value, and sending the preset feeding speed to the coating device,
where T1 is a standard film thickness, T2 is the detected film thickness, and V is an original feeding speed of the coating device when the detecting device is detecting the film thickness of the coating material at the measuring point.

* * * * *